United States Patent
Taylor

(10) Patent No.: US 6,955,199 B1
(45) Date of Patent: Oct. 18, 2005

(54) TIRE WITH NON-MARKING TREAD

(75) Inventor: Fredrick Taylor, Rome, GA (US)

(73) Assignee: FBT Enterprises, Inc., Rome, GA (US)

( * ) Notice: Subject to any disclaimer, the term of this patent is extended or adjusted under 35 U.S.C. 154(b) by 151 days.

(21) Appl. No.: 10/036,691

(22) Filed: Dec. 21, 2001

Related U.S. Application Data

(60) Provisional application No. 60/257,734, filed on Dec. 21, 2000.

(51) Int. Cl.[7] .................. B29D 30/52; B60C 11/00; C08K 3/04; C08K 3/36; C08L 7/00
(52) U.S. Cl. .................. 152/209.1; 152/209.5; 152/905; 156/128.1; 524/492; 524/495; 525/237
(58) Field of Search .................. 152/209.1, 209.5, 152/905; 156/128.1; 524/492, 493, 495, 524/496; 525/237

(56) References Cited

U.S. PATENT DOCUMENTS

| | | | | |
|---|---|---|---|---|
| 3,658,639 | A * | 4/1972 | Wirth | 152/209.5 |
| 4,350,621 | A * | 9/1982 | Bond et al. | 525/237 |
| 5,216,066 | A * | 6/1993 | Sandstrom et al. | 524/495 |
| 5,439,727 | A | 8/1995 | Riggs et al. | |
| 5,697,465 | A | 12/1997 | Kruse | |
| 6,579,930 | B2 * | 6/2003 | Herberger et al. | 524/492 |
| 2002/0045697 | A1 * | 4/2002 | Sohnen et al. | 524/492 |

FOREIGN PATENT DOCUMENTS

| | | | |
|---|---|---|---|
| DE | 19653371 | * | 6/1998 |
| EP | 708137 | * | 4/1996 |
| EP | 864447 | * | 9/1998 |
| GB | 2239870 | * | 7/1991 |
| JP | 64-74104 | * | 3/1989 |

OTHER PUBLICATIONS

Kirk-Othmer Encyclopedia of Chemical Technology, "Rubber Compounding", section 3 "Vulcanization" (15 pages), section 5 "Processing Agents" (3 pages), section 6 "Antidegradants" (6 pages) and section 7 "Tire Compiunding" (24 pages); 1997.*
Translation for Japan 64-074104.*
Translation for Europe 708137.*

* cited by examiner

Primary Examiner—Steven D. Maki
(74) Attorney, Agent, or Firm—Thomas, Kayden, Horstemeyer & Risley, L.L.P.

(57) ABSTRACT

The present invention overcomes several disadvantages in conventional tires by providing a non-marking surface to the tire. The tire can be a pneumatic bias tire having a pair of parallel annular beads, at least one carcass ply wrapped around the beads, a non-marking tread cap, a tread base and sidewalls. A colorant may be added to the composition of the tread cap to create a tire having a colored, non-marking tread cap.

11 Claims, 4 Drawing Sheets

TIRE WITH NON-MARKING TREAD

RELATED U.S. APPLICATION DATA

This application claims priority from U.S. Provisional Application No. 60/257,734 filed 21 Dec. 2000 incorporated herein by reference.

BACKGROUND OF THE INVENTION

1. Field of the Invention

This invention relates generally to protecting a surface from damage by vehicle tires and more particularly to a tire with a non-marking tread.

2. Description of Related Art

Many surfaces can be severely damaged by the mars and scuffs (marking of surface) generated by vehicle tires riding over these surfaces. Such scuffs can result in expensive and extensive clean up in order to restore the surface.

In the tire industry, it is typical that one beneficial characteristic of the tire is sacrificed when provide some other beneficial characteristic. For example, in the construction industry, aerial lift tires are designed to provide shock absorption, stability, puncture resistance, long life and traction. However, the traditional tire compound ingredients and manufacturing processes used to provide such an aerial lift tire result in a tire that has the disadvantage of marking or scuffing the surface upon which it operates.

Scuff marks are often referred to as skid marks, scours, footprints, tire marks and tread marks. Conventional tires tend to leave such marks. Common construction and building maintenance practices require that construction equipment ride over floor surfaces without creating such scuff marks. For example, construction equipment at a building site regularly operate atop concrete floors, which floors will be exposed surfaces when the building process is complete. Further, to facilitate the repair, renovation, delivery of materials and goods, and the movement of people within buildings, vehicles regularly operate over the floors of these buildings. Yet, if such buildings are, for example, medical, food processing and handling, clean rooms, auditoriums, sports arenas, shopping malls, airports, and the like, contamination and markings on the floors are unacceptable for reasons such as health, safety and appearance.

Traditional industrial anti-scuff remedies presently include solid tires that are (i) harder riding and heavier than pneumatic tires, (ii) not offered in a wide range of sizes, and (iii) not suited for riding atop soft surfaces. Other anti-scuff attempts include, but are not limited to, converting a conventional new tire having a marking tread cap to a non-marking recapped tire, or wrapping tape around the tread cap of a conventional tire, and/or spending an inordinate amount of time thoroughly cleaning the operational floor surface after it has been marked up and after the construction or repairs are completed.

Yet another example of disadvantageous non-marking designs include non-marking recapped tires produced from a conventional new tire having a normal marking tread cap compound. The new tire is sent to a retreader where the tread cap of the tire is ground off using a mechanical grinding process. A new pre-cured tread cap composed of non-marking materials is then attached to the ground down tire through a variety of bonding techniques, including vulcanizing the non-marking tread cap to the tire. This process and the resulting recapped tire have several limitations, including a high expense and environmental problems with the buffing dust. Recapping is a very costly process. Recapping costs begin with the cost of the original tire purchase, and include the cost of the recapping process, the lost time during which the equipment is inoperable because the tire has been sent out to be recapped, and the administration cost of the entire process. Since the conventional tire purchase price typically equals the retreading process price, a non-marking recapped tire is usually at least twice the cost or more of an ordinary tire.

Another conventional anti-scuff system incorporates the use of a conventional tire wrapped with tape to render the tire's tread surface non-marking. Taping of the tire may be as costly as recapping, yet even less effective. One problem associated with a taped tire is that the tape wears out fairly quickly both on the clean surface (the surface to be protected from markings), but even more quickly on an outside surface. During normal operation, the tape can rapidly deteriorate through ripping, tearing and normal wear. The resultant tire with portions of tape thereon, and portions of glue where tape has fallen off, would be incredibly difficult to clean prior to the tire re-entering the clean surface from the outside surface. Or, the tape must be fully restored over the tire to prevent tire marking. Yet a further disadvantage of this approach is the difficulty in removing the tape. Frequently the glue on the tape is transmitted to the surface of the tire, and upon removal of the tape, the tire is rendered useless. Because of these inherent inefficiencies of taping, cleaning of the operating surface is often required once the construction or repairs are complete. Another limitation of taped tires is the loss of traction between the tape and the floor surface (and the tap and the tire surface) when a taped tire is washed with water or cleaning agents prior to re-entry onto the clean surface.

Exemplary patents in this field include U.S. Pat. No. 5,439,727 to Riggs et al., which discloses an anti-scuff device that mounts, or wraps, around the surface of a tire. The anti-scuff strip is wider than the tire tread so it will overlay the tire tread and a portion of each side wall of the tire with the strip being fastened to the tire along both sides. CORDURA® PLUS is disclosed as a preferable anti-scuff material. The Riggs et al. anti-scuff material envelops a conventional tire so the tire does not contact the floor surface via the tread, but by the anti-scuff material. The Riggs et al. tire suffers from loss of traction between the tire surface and the enveloping device when the tire is cleaned with water or other cleaning agents. Riggs et al. nether teaches or suggests a process of manufacturing a non-marking tread or a tire incorporating non-marking tread.

U.S. Pat. No. 5,697,465 to Kruse discloses a personal mobility vehicle incorporating outrigger type anti-scuff wheels. Anti-scuff rollers or bumpers 86 and 88 are connected to support arms 82 and 84 positioned above the anti-tip wheels 90 and 92, respectively. The anti-scuff rollers 86 and 88 are freely rotatable about an upright axis for preventing the accidental contact with the wall by any other part of the rear of the vehicle 10. Yet, such additional rollers/bumpers increase the overall width of the vehicle, thus reducing its ability to fit through existing openings. Similarly, this patent discloses no other information about an anti-scuff roller or a process of making the roller.

It would be beneficial to provide a non-marking tire that can effectively maneuver a vehicle riding atop a first floor surface that could not tolerate contamination and tire markings, wherein the tire would also permit the same vehicle to exit the first floor surface to other types of surfaces, for example, when retrieving additional materials and/or discarding waste materials, but also enables the vehicle to effectively maneuver on those other types of floor surfaces.

For re-entry of the vehicle onto the first floor surface, the non-marking tires need only be washed free of dirt or other contaminants.

Thus, it can be seen that there is a need for protecting surfaces from tire damage by using a novel tire with non-marking tread. A non-marking tread is herein defined as a tread that tends not to leave scuff marks.

BRIEF SUMMARY OF THE INVENTION

The present invention relates generally to tires used in many types of applications. The present invention overcomes several disadvantages inherent in convention tires, and relates more specifically to a tire presenting a non-marking surface, providing a novel pneumatic tire that has an integral non-marking surface.

Tires of the present invention can be used in connection with, but not limited to, golf carts, passenger cars, trucks, buses, trailers, motorcycles, bicycles, scooters, agricultural equipment, construction equipment, lawn and garden vehicles, inter-modal equipment, aerial lifts, skid steers, ground supports, wheelchairs, hand dollies, fork trucks, people movers and the like. The present tire is applicable to bias and radial tire designs of all sizes and used in a variety of applications.

Briefly described, in a preferred form, the present invention is a tire having non-marking tread, and a process of manufacturing such a tire that comprises a step of forming a non-marking tread on a pneumatic tire upon original manufacture of the tire (concurrent with the manufacture of the tire), thus removing the retreading process altogether and reducing the cost of a tire with non-marking tread. The non-marking pneumatic tire of the present invention preferably comprises a pair of parallel annular beads, at least one carcass ply wrapped around the beads, a non-marking tread cap, a tread base and sidewalls. These tire components can be constructed in a variety of processes using multiple compounds and ingredients.

To make the tire of the present invention, a green tire is built in the conventional manner with the exception that the tread cap is specifically formulated to produce a non-marking tread. The tire is then cured resulting in a new tire having a non-marking tread cap.

The non-marking tread composition of the present tire comprises the following ingredients: natural and/or synthetic rubber, ethylene propylene rubber, polybutadiene rubber, carbon black, white carbon, and rubber oil (paraffinic oil). The non-marking tread cap composition can also include zinc oxide, stearic acid, tackifier, microcrystallized wax, antioxidant, antiozonant, sulphemamide, mercapto benzothiazole, thiuram, insoluble Sulfur and/or Sulfur.

The present non-marking tire can effectively maneuver a vehicle riding atop a first floor surface that cannot tolerate contamination and tire markings, wherein the tire also permits the same vehicle to exit the first floor surface to other types of surfaces, for example, when retrieving additional materials and/or discarding waste materials, but also enables the vehicle to effectively maneuver on those other types of floor surfaces. For re-entry of the vehicle onto the first floor surface, the present non-marking tires need only be washed free of dirt or other contaminants.

It is thus an object of the present invention to provide a tire with non-marking tread.

It is another object of the present invention to provide a method of manufacturing a tire with non-marking tread upon original manufacture of the tire.

Further, it is an object of the present invention to provide a tire with a non-marking tread that provides a cost effective alternative to conventional tire anti-scuffing processes.

These and other objects, features, and advantages of the present invention will become more apparent upon reading the following specification in conjunction with the accompanying drawing figures.

DETAILED DESCRIPTION OF THE PREFERRED EMBODIMENTS

Figure 1:
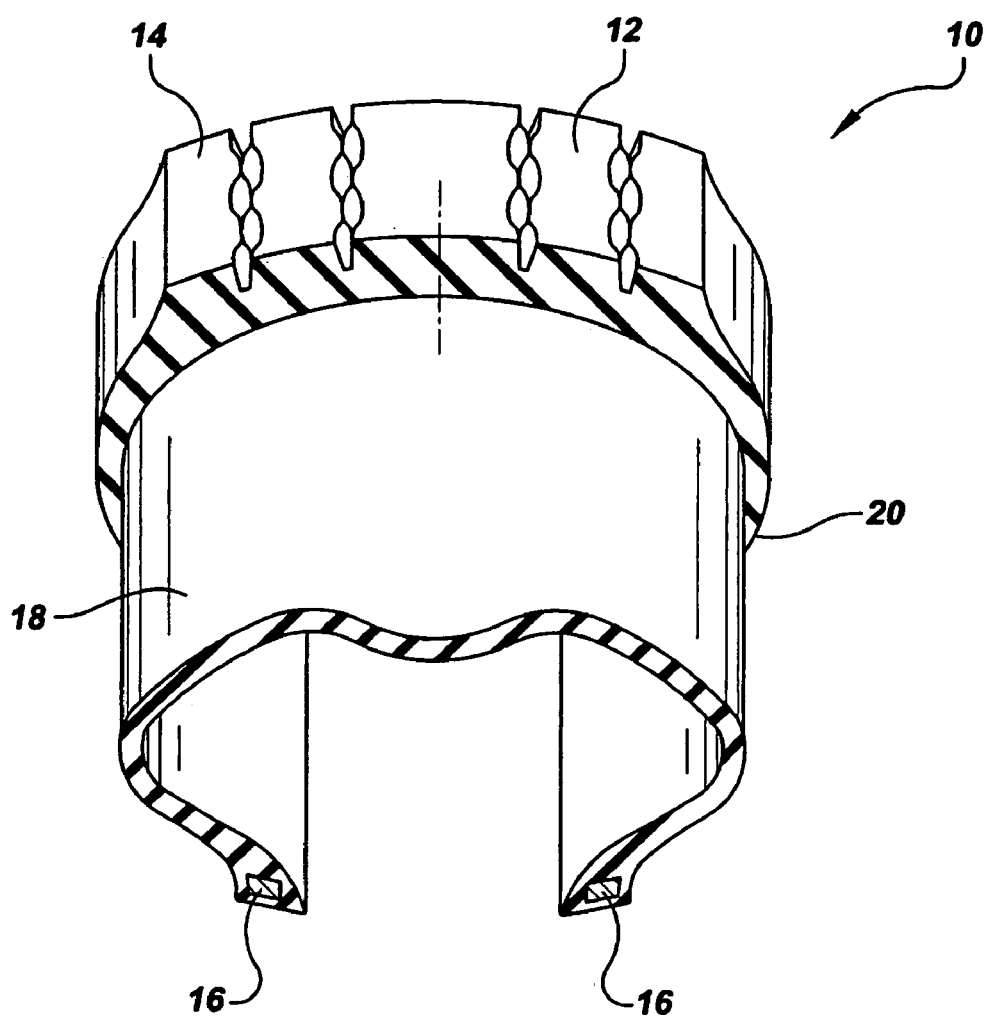
FIG. 1 is a cross-sectional perspective view of a preferred embodiment of the present tire.

The components of the present invention are referenced herein as follows:

| NO. | COMPONENT |
|---|---|
| 10 | Tire |
| 12 | Tread Base |
| 14 | Tread Cap |
| 16 | Bead Members |
| 18 | Carcass Ply |
| 20 | Sidewall Portions |

Referring now in detail to the drawing figures, wherein like reference numerals represent like parts throughout the several views, FIGS. 1–4 illustrate preferred embodiments of the present tire 10, that being a bias tire 10.

The Non-Marking Tire of the Present Invention

The non-marking tire 10 of the present invention preferably is produced somewhat akin to conventional tire manufacturing process, yet incorporating several deviations, one exception being that conventional tread cap compositions are not used during the present tire build. The present tire comprises a tread base 12 incorporating ingredients specifically designed to provide a non-marking tread cap 14 that will not mark the surface over which the tire 10 is riding, yet such tread will remain secured to the tread base. The present tread cap 14 is preferably free of contamination during the mixing, shaping, curing, storage and material handling of the non-marking tread cap. Any contamination of the non-marking tread cap could reduce the effectiveness of the non-marking characteristics of the tread cap 14.

Figure 2:
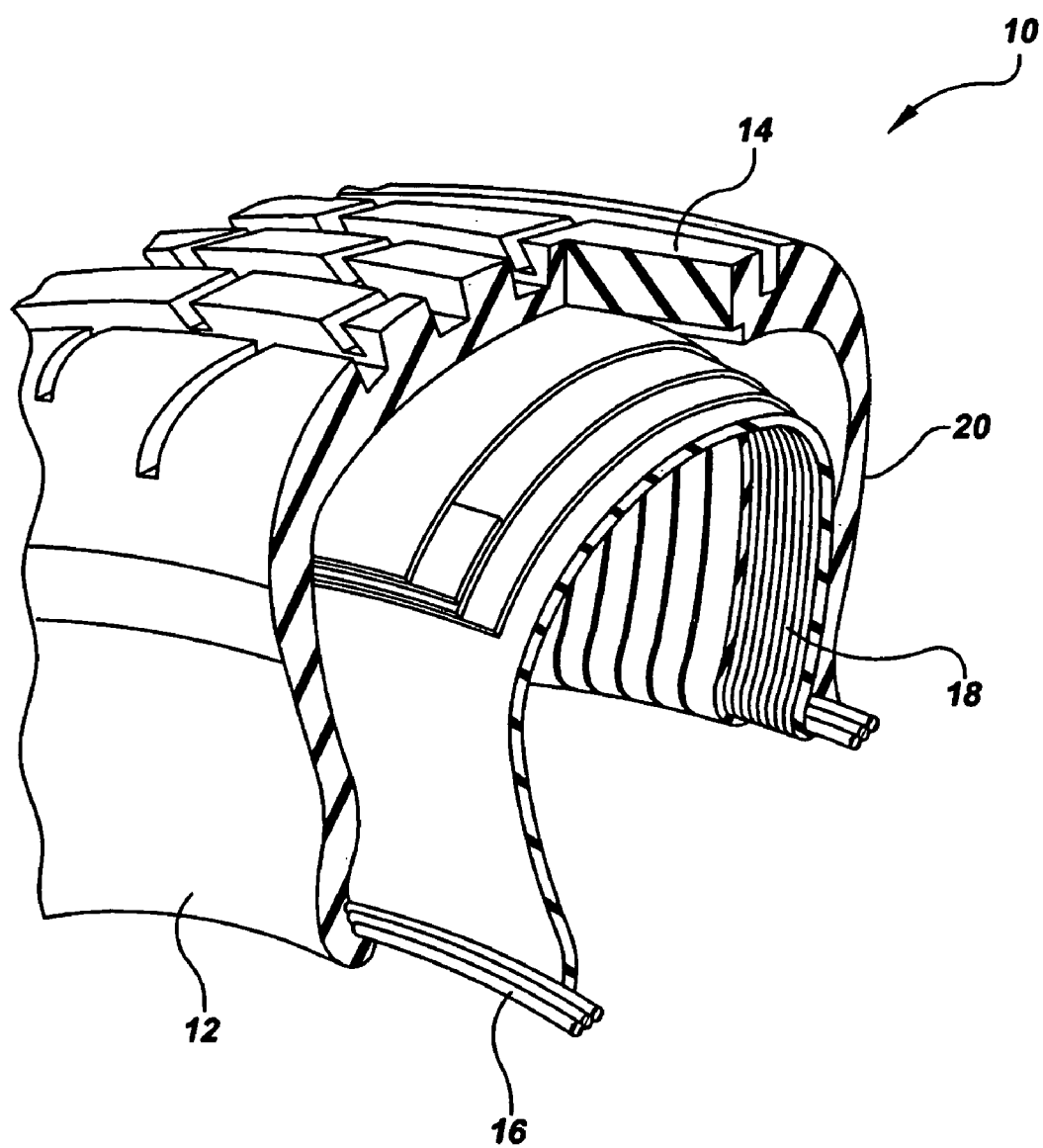
FIG. 2 illustrates cross-sectional perspective view of another preferred embodiment of the present tire
Figure 3:
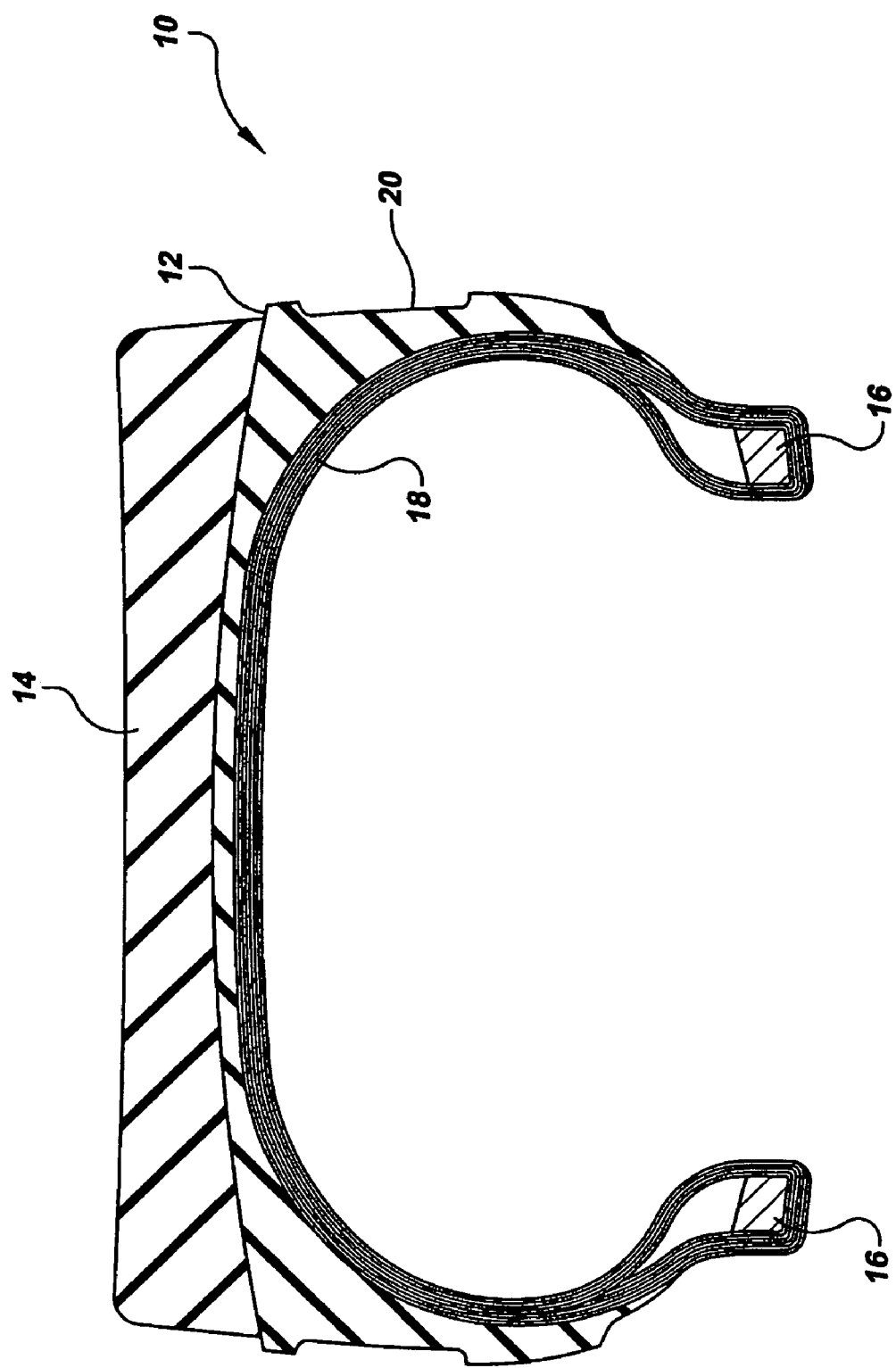
FIG. 3 illustrates a cross-section of a cured tire of the present invention.

With reference to FIGS. 1–3, tire 10 is of a bias ply construction and is adapted for mounting on a tire rim. The tire 10 includes a pair of bead members 16, a pair of sidewall portions 20 each being disposed on a respective side of a mid circumferential plane of the tire 10 and having a bead member 16 disposed therein, and at least one carcass ply 18 wrapped around beads 16, tread cap 14 disposed over tread base 12 and carcass ply 18, and sidewall portions 20 disposed between the tread base 12 and the beads 16. Tread cap 14 comprises the non-marking tread. Tread base 12 and tread cap 14 work together to give the tread 12, 14 flexibility and rebound properties that enhance the wear, mileage, handling and traction properties described for the tire.

The bead members 16 preferably are loops of high-strength steel cable coated with rubber, giving the tire 10 the strength it needs to stay seated on the wheel rim and to handle the forces applied by tire mounting machines when the tires are installed on rims. The ply 18 can comprise fabric being polyester cord. The ply 18 can be coated with rubber to help it bond with the other components and to seal in the air.

Tire 10 can further comprise a cap ply of polyester fabric to help hold everything in place. The cap ply would be used on tires with higher speed ratings to help all the components stay in place at high speeds.

The tread 12, 14 can be made from a mixture of many different kinds of natural and synthetic rubbers. The tread base 12 and tread cap 14 preferably comprise complimentary properties that allow co-extrusion and vulcanization.

Several construction embodiments exist for the present tire 10. The present tire 10 can be bias or radial, single or multiple bead, have under-the-tread reinforcements (including but not limited to belts, breakers, cap plies, tread plies and inserts), or not, and have sidewall reinforcement or not. Reinforcements can include textiles, metallics and/or polymers.

The tread cap 14 compound can be altered to provide wear characteristics that closely match the application to which the tire 10 will be subjected. For example, softer compounds are more appropriate for lawn and garden applications, whereas harder compounds are more fitting for highway applications.

It will be understood in the art that the composition of elements of the tire 10 can vary. For example, the sidewall 20 and tread base 12 can be formed of the same or different compounds, and may or may not be an integral unit. Tire 10 need not include tread base 12 in some embodiments.

Tire 10 can be built in a single stage, or in more than one stage. In a first stage, the tread cap 14, tread base 12 and/or sidewalls 20 may be applied. The plies of the present tire 10 can comprise include textiles, metallics, polymers, or a combination/subcombination of such materials. The plies need not be continuous.

Tire 10 can incorporate a gutter or other means of insertion after curing, instead of during building of the tire. Further, the molds for the present tire 10 can include clam shell or segmented, and can comprise, for example, aluminum and steel. The molds for the tire 10 can include circumferential ribs and/or extra vents located at the intended junction of the tread cap 14 and sidewall 20 to permit buffing, lathing or other means to produce a more uniform junction line between the different elements.

Tire 10 may be pressurized with gasses such as air and nitrogen, and/or pressurized with liquid fill or other media such as urethane.

A Method of Manufacture a Non-Marking Tire of the Present Invention

Once the tire components are obtained, they are assembled in one or more stages on a drum or other commonly known tire build machine. The machine can ensure that all of the components are in the correct location and then forms the tire 10 into a shape and size fairly close to its finished dimensions. The components less the tread cap 14 are then processed on the tire building machine, producing what is referred to as a "Green Tire." At this point the tire has most or all of its pieces, but is not held together very tightly, and will not include markings or tread patterns. After preparation of the Green Tire, the next step includes running the tire into a curing machine molding in all of the markings and traction patterns. The heat bonds all of the tire's components together during vulcanizing. After a few finishing and inspection procedures, the tire 10 is finished.

Figure 4:
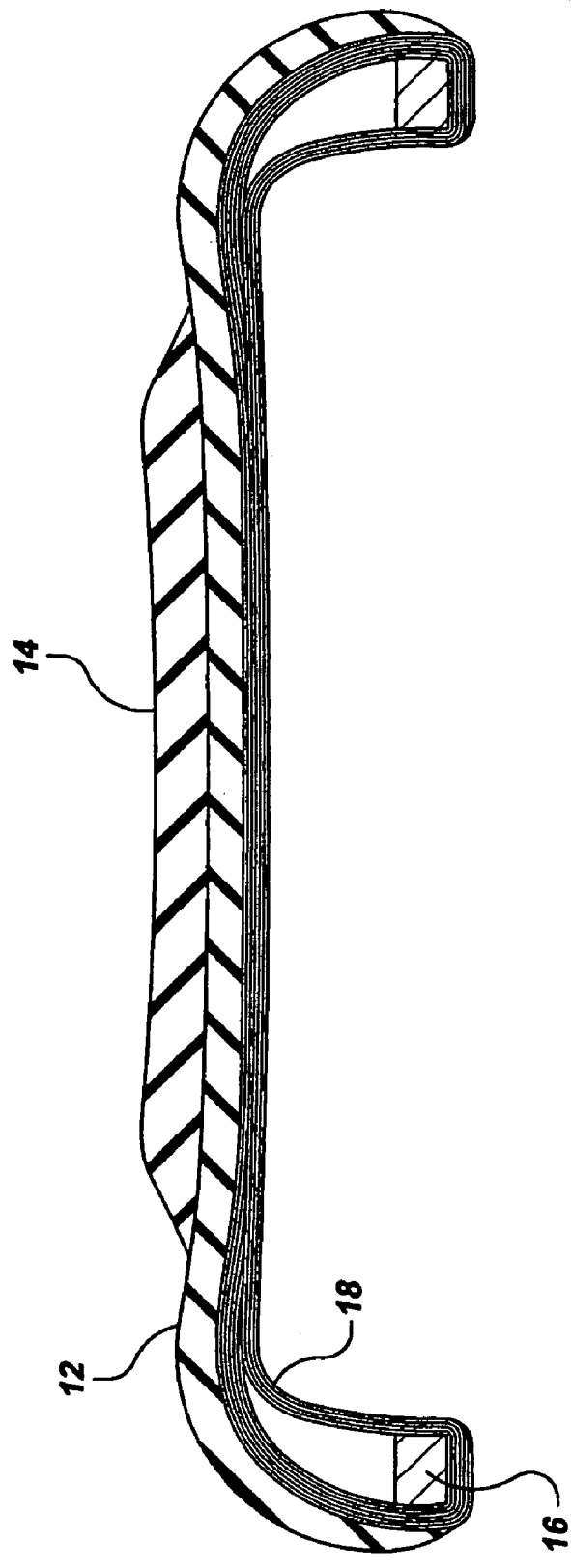
FIG. 4 illustrates a cross-section of a green tire of the present invention.

A cross section sketch of a Green Tire is shown in FIG. 4. This is yet another deviation from the conventional tire manufacturing process. Preferably, according to the present invention, the Green Tire is built first without the tread cap 14. In the conventional process, the Green Tire is built including a conventional marking tread cap.

A further aspect of novelty of the present tire is that a non-marking tread cap 14 composition is then added to the Green Tire prior to curing the tire 10. The Green Tire including the non-marking composition is then cured resulting in a new tire having a non-marking tread cap.

The non-marking tire 10 can be produced using many of the conventional tire manufacturing processes. The specifically formulated tread cap 14 will require handling throughout the process, from initial mixing of the material to storage, handling and shipping of finished tires, in order to limit or prevent contamination of the formulated tread cap 14 that could possibly reduce the effectiveness of the non-marking properties of the tire 10.

The tire 10 preferably will include (i) fabric, for example, steel, nylon, aramid fiber, rayon, fiberglass, or polyester, (ii) rubber, preferably including natural and synthetic, (iii) reinforcing chemicals, for example, carbon black, silica and resins, (iv) anti-degradants, for example, antioxidants/ozonants and paraffin waxes, (v) adhesion promoters, for example, cobalt salts, brass on wire, and resins on fabrics, (vi) curatives, for example, cure accelerators, activators and sulfur, and (vii) processing aids, for example, oils, tackifiers, peptizers, softeners.

The preferred components of the tire tread cap 14 of the present invention, and the respective approximate parts per weight ratio range of each ingredient of the tread, is as follows:

| Ingredient | Range |
|---|---|
| Natural/Synthetic Rubber | 30–70 |
| Preferably | 55–65 |
| Ethylene Propylene Rubber | 20–50 |
| Preferably | 35–45 |
| Polybutadiene Rubber | 20–50 |
| Carbon Black | 11–60 |
| White Carbon | 11–60 |
| Rubber Oil (Paraffinic Oil) | 7.5–20 |
| Preferably | 18.0–19.0 |
| Zinc Oxide | 1–5 |
| Stearic Acid | 0–1 |
| Tackifier | 7–30 |
| Preferably Alkyl Phenol Formaldehyde | 2–6 |
| Microcrystellized Wax | 0–12 |
| Preferably | 7–12 |
| Antioxidant | 0–15 |
| Preferably | 13.4–13.7 |
| Preferably Phenolics and Para-Phenylenediamines | 0–15 |
| Antiozonant | 0–5 |
| Preferably EPDM Particle | 0–1 |
| Sulphemamide | 0–1 |
| Mercapto Benzothiazole | 0–1 |
| Thiuram | 0–1 |
| Insoluble Sulfur | 0–1 |
| Sulfur | 0–2 |
| Preferably | 1.7–1.9 |
| Colorant | 0–10 |

In the rubber composition of the present invention, additives, such as, coupling agents for silica, vulcanizing agents, softeners, zinc oxide, stearic acid, antioxidants, antiozonants, fillers such as carbon black and silica, and wax, can suitably be used in combination with an accelerator.

The amount of rubber oil (parafinic oil) affects the ability of the tread cap composition to act like an eraser on the surface in which it comes in contact. The greater the amount of rubber oil the more the tread cap is able to act like an eraser.

The tread cap itself, or the entire tire, can be colored, for example, to match equipment manufactures' color schemes, indicate ownership, and the like. A tire, for example, having a green tread cap can be created from the above method and composition by including up to 10% of a green colorant by weight. Suitable colorants include dyes and stains. The inclusion of a colorant in the non-marking composition of the present invention does not create a tire which scuffs or otherwise marks the surface on which it travels.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A method of building a tire including a tread cap comprising the following steps:
   (a) forming a green tire having a tread region without the tread cap;
   (b) forming the tread cap as a non-marking tread cap, the composition of the tread cap comprising between 30–70 parts of natural and synthetic rubber, 20–50 parts of ethylene propylene rubber, 11–60 parts of carbon black, 11–60 parts of white carbon, and 7.5–12.5 parts of rubber oil, the parts being parts by weight of the tread cap; and
   (c) integrating the tread cap with the tread region of the tire.

2. The method of building a tire according to claim 1, the tread cap further comprising 1–5 parts of zinc oxide, 0–1 parts of stearic acid, 7–30 parts of tackifier, 7–12 parts of microcrystallized wax, 1–5 parts of antioxidant, 1–5 parts antiozonant, 0–1 parts of sulphemamide, 0–1 parts of mercapto benzothiazole, 0–1 parts of thiuram, 0–1 parts of insoluble Sulfur and 0–2 parts of Sulfur.

3. The method of building a tire according to claim 1, the tread cap further comprising a colorant for creating a colored, non-marking tread.

4. The method of building a tire according to claim 1, further comprising the step (d) of curing the green tire with the tread cap to create a tire having the tread cap of a non-marking composition.

5. A tire made by the process of claim 1.

6. The tire of claim 5, wherein the tread cap further includes polybutadiene rubber, microcrystallized wax, antioxidant and antiozonant.

7. The tire of claim 5, the tread cap further comprising 1–5 parts of zinc oxide, 0–1 parts of stearic acid, 7–30 parts of tackifer, 7–12 parts of microcrystallized wax, 1–5 parts of antioxidant, 1–5 parts antiozonant, 0–1 parts of sulphemamide, 0–1 parts of mercapto benzothiazole, 0–1 parts of thiuram, 0–1 parts of insoluble Sulfur and 0–2 parts of Sulfur.

8. The tire of claim 7, wherein the tire is a pneumatic bias tire.

9. The tire of claim 8, further comprising a colorant for creating a colored, non-marking tread.

10. In a method of building a tire including a tread cap the improvement comprising the following steps:
   (a) forming a green tire having a tread region without the tread cap;
   (b) forming the tread cap as a non-marking tread cap, wherein the tread cap consists of natural and synthetic rubber, ethylene propylene rubber, polybutadiene rubber, carbon black, white carbon, rubber oil, zinc oxide, tackifier, microcrystallized wax, antioxidant, antiozonant, and optionally stearic acid, sulphemamide, mercapto benzothiazole, thiuram, insoluble Sulfur and Sulfur;
   (c) integrating the tread cap with the tread region of the green tire; and
   (d) curing the green tire with the tread cap to create a tire having the tread cap of non-marking composition.

11. A tire made by the process of claim 10, wherein the natural and synthetic rubber is present in the amount of 30–70 parts, the ethylene propylene rubber is present in the amount of 20–50 parts, the carbon black is present in the amount of 11–60 parts, the white carbon is present in the amount of 11–60 parts, and the rubber oil is present in the amount of 7.5–12.5 parts, the parts being parts by weight of the tread cap.

* * * * *